June 12, 1923.
C. E. DAVIS
1,458,130
PROCESS AND APPARATUS FOR CLASSIFYING FOOD PRODUCTS
Filed April 6, 1921    2 Sheets-Sheet 1
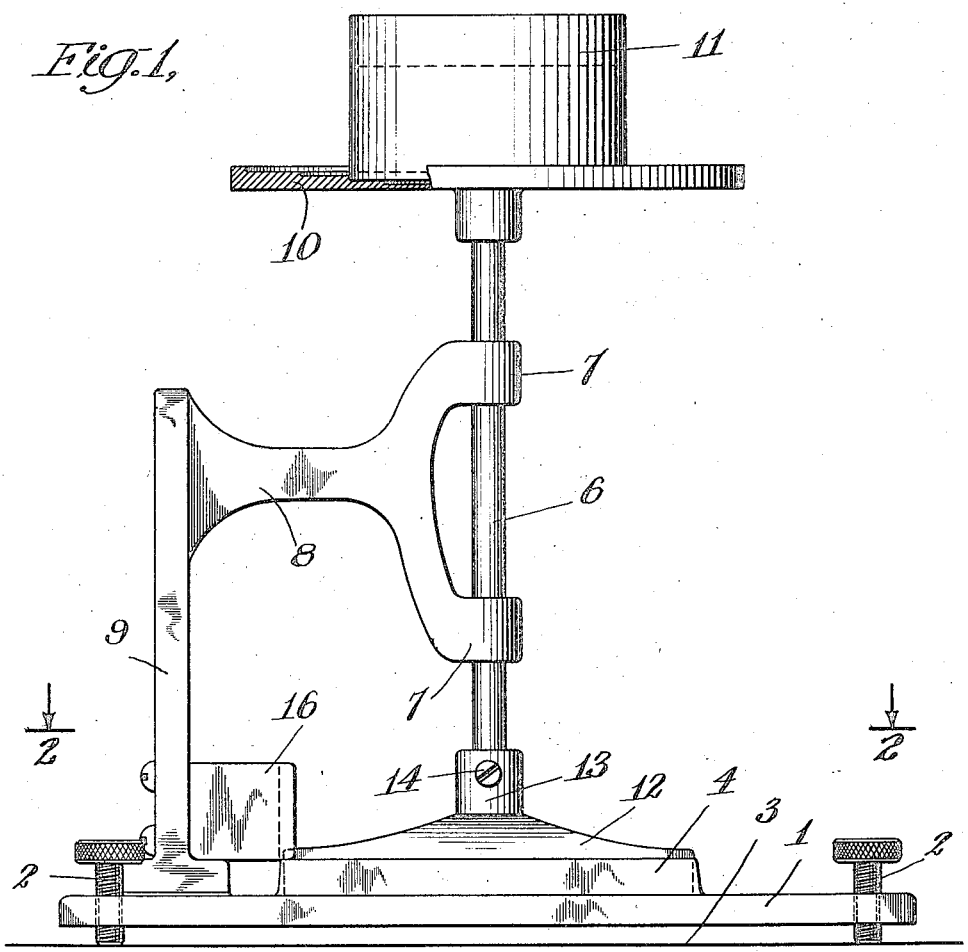
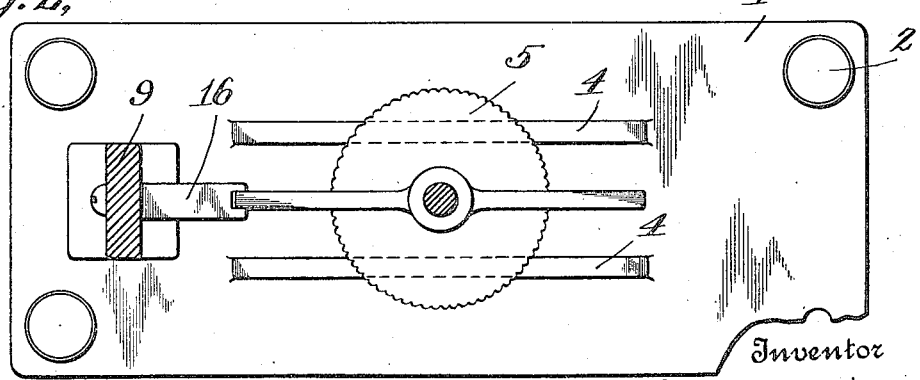
Inventor
Clarke E. Davis
By his Attorney June 12, 1923.
C. E. DAVIS
PROCESS AND APPARATUS FOR CLASSIFYING FOOD PRODUCTS
Filed April 6, 1921  2 Sheets-Sheet 2
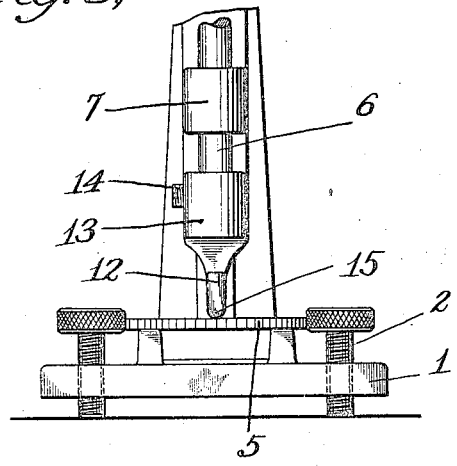
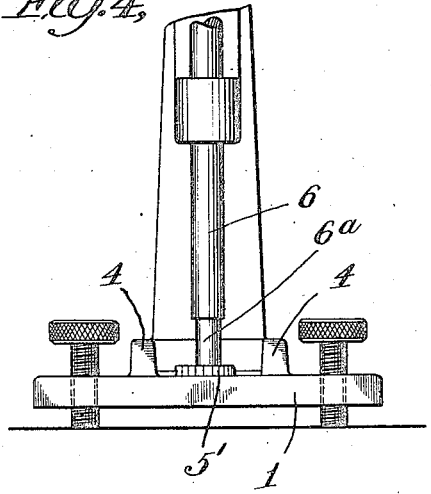
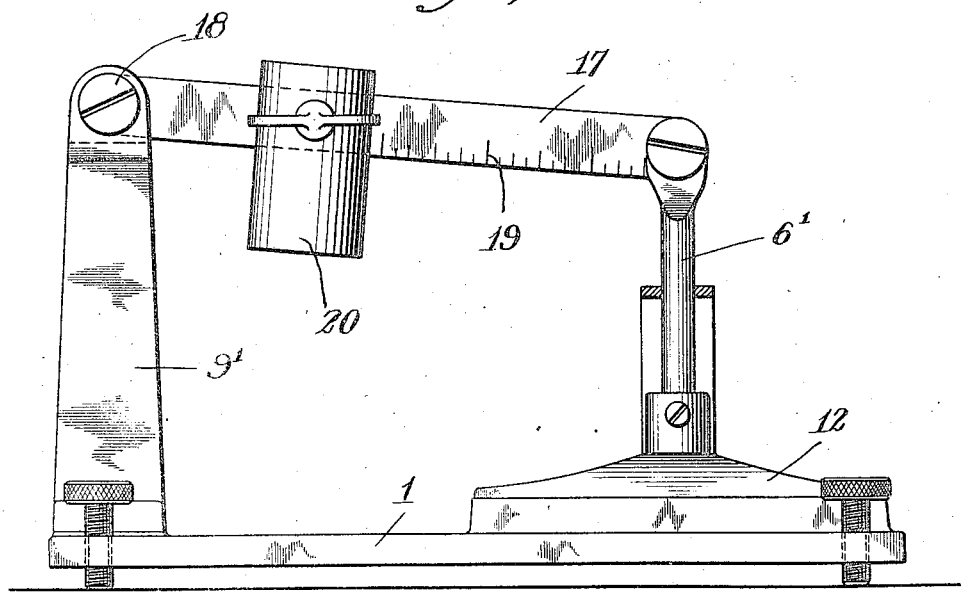

Patented June 12, 1923.

1,458,130

UNITED STATES PATENT OFFICE.

CLARKE E. DAVIS, OF DOUGLASTON, NEW YORK, ASSIGNOR TO NATIONAL BISCUIT COMPANY, OF NEW YORK, N. Y., A CORPORATION OF NEW JERSEY.

PROCESS AND APPARATUS FOR CLASSIFYING FOOD PRODUCTS.

Application filed April 6, 1921. Serial No. 459,207.

*To all whom it may concern:*

Be it known that I, CLARKE E. DAVIS, a citizen of the United States, and resident of Douglaston, in the county of Queens and State of New York, have invented certain new and useful Improvements in Processes and Apparatus for Classifying Food Products, of which the following is a specification.

My invention relates to a process whereby baked food products such as biscuits, cakes and the like may be tested and classified in regard to the shortening value of the same, or of ingredients thereof, or other properties thereof. The invention also relates to improved apparatus by which the process referred to may be practised.

My invention is particularly directed to testing food products to determine the relative values of different shortening materials and also, when desired, to classify the various kinds of flour, which may be used therein. I have found that the shortness imparted to cakes or the like, by different shortening ingredients, may be calculated quite accurately by determining the amount of force required to break, or to crush cakes or other test piece which have been made under similar conditions and of the same ingredients with the exception of the shortening material. Conversely, I find that when the shortening ingredient is the same, but the kind of flour is varied, in a batch of cakes to be tested, in comparison with the standard cake, the breaking test or the crushing test may be utilized to classify the flour.

The term "shortening" has never been satisfactorily defined and, so far as I am aware, no satisfactory means or methods have previously been proposed for measuring shortening values of different substances. I have, however, determined that the value of a shortening material may be determined to a sufficient extent by measuring the resistance of a baked product, including the shortening material, to breaking, and also by measuring the resistance of the same to crushing. It is clear that these tests are suitable ones, in view of the fact, that when one eats a cracker or the like the degree of shortness of the same is first apparent when the cracker is broken either by the aid of the hands or by the teeth. The quality of shortening of the article is also more or less apparent during the chewing operation which really is one of grinding or crushing.

I have accordingly devised an apparatus whereby the comparative force required to break or to crush cakes or test pieces made under suitable conditions may be accurately measured. I practise my novel process by making series of small cakes or test pieces which are so made that the shortening ingredient is the only variable therein, or by leaving the shortening ingredient constant and varying the flour, and classifying the products in accordance with the resistance to breaking or to resistance to crushing of the same.

The force required to break or crush any food product of the character of those with which I am concerned is necessarily very small. This, of course, requires that the measuring machine be extremely sensitive so that the accuracy of the same should be of the highest order.

In order that my invention may be more clearly understood, attention is hereby directed to the accompanying drawings forming part of this application and illustrating certain embodiments of apparatus included within my invention. In the drawings, Fig. 1 represents a side elevation of one form of testing device comprised within my invention; Fig. 2 is a horizontal section taken upon line 2—2 of Fig. 1; Fig. 3 is an end elevation of the lower portion of the apparatus shown in Fig. 1 engaged in breaking a test cake; Fig. 4 is a view similar to that shown in Fig. 3 showing, however, the test of a sample cake for its resistance to crushing and Fig. 5 is a side elevation of a modified form of testing apparatus, a part thereof being shown in section.

In the apparatus shown in Figs. 1 to 4, inclusive of the drawings, a table 1 is supported by means of adjustable screws 2, or is otherwise supported above a surface 3 in such manner that it may be accurately leveled. A pair of parallel rails 4 extend upwardly from table 1 to form supports on which a cake or the like 5 may be placed when the same is to be tested for its resistance to breaking.

I provide means for causing a determinable force to be applied substantially in a line across the cake to break the same. In the apparatus illustrated a vertical spindle or rod 6 is slidably mounted in vertical bearings 7, formed on a lateral extension 8 of a vertical standard 9 which is mounted on table 1. Spindle 6 may carry a horizontal support 10 at its upper end on which a vessel 11 may be positioned. This vessel may be filled more or less with shot or the like, the weight of which may be determined.

The striking member for determining the breaking strength of the cake may be, and preferably is detachable from spindle 6. This striking member may take the form of an elongated member 12 having a socket 13 formed integral therewith or secured thereto to extend upwardly therefrom. The lower end of spindle 6 is inserted in this socket and secured thereto by suitable means such as the set-screw 14.

The bottom or striking face of member 12 is preferably rounded and comparatively narrow as is indicated in Fig. 3 at 15. Spindle 6 is guided in its fall by suitable means so that striking member 12 will strike each test cake along substantially the same line. I have illustrated one means by which member 12 may be thus guided, as comprising a guideway 16 secured to standard 9 and having a slot or guide in which one end of member 12 slidingly engages.

When a cake is to be broken it is positioned across the rails 4 and member 12 dropped a determined distance upon the same so as to strike the same across a diameter thereof. If the cake is not broken, more shot is placed in vessel 11 and the weight increased until the cake breaks when the weight of the shot plus the weight of the remainder of the working parts of the apparatus, may be recorded. The member 12 should of course be dropped through the same distance each operation. This may be readily accomplished by lifting member 12 each time until the upper surface of socket 13 contacts against the under surface of the bottom bearing 7.

A modified form of apparatus is shown in Fig. 5, in which the spindle 6' is pivotally connected to an arm 17 which is pivoted at 18 to the standard 9'. Arm 17 carries a graduated scale as indicated at 19 and a weight 20 is carried by the arm, this weight being adjusted into different positions lengthwise of the arm from which the force exerted by the striking member 12 may readily be determined.

When it is desired to test the resistance of a test cake to crushing, a portion of the cake, as indicated at 5' in Fig. 4, may be positioned on table 1 between the two rails 4, 4 so that the cake will rest firmly on the table. Striking member 12 is removed from spindle 6 by unscrewing set-screw 14. The lower portion 6ª of spindle 6, upon which member 12 was previously secured, has a horizontal bottom surface of comparatively small diameter. This surface is well adapted for striking a crushing blow upon the cake. The resistance of the cake to crushing is determined by dropping the spindle upon the cake while increasing the weight carried by or effective upon the spindle until the blow delivered by the lower end of the spindle crushes or pulverizes the portion of the cake against which it strikes.

In practising the process described it is of course essential that the various test cakes should be made under known conditions. For the purposes of determining relative values of shortening materials it was decided to use a variety of sugar cake because the amount of shortening used is a fair average. These cakes were made from specified proportions of flour, shortening, sugar, water, salt, ammonium bicarbonate, acid phosphate, sodium bicarbonate.

To obtain trustworthy results in any series of experiments it is necessary to standardize the conditions. In the manufacture of a cracker there are many variables, such as the exact amount of raw material used; the temperature of the dough while mixing; the time of mixing; the pressure exerted upon this dough by the brake; the temperature of the baking oven; the conditioning of the cracker after baking, etc. In the tests described these conditions have all been so standardized that each cracker gets the same treatment as every other one. The materials are all accurately weighed; the doughs are all made as near the same temperature as is possible, which is in the vicinity of 80°; the time of mixing is the same, which is seven minutes; the brake treatment is the same, giving green cakes all of the same thickness, which is a scant ⅛ inch; and the crackers are cut always of the same diameter, which is 2 5/16 inches, and placed upon the pans in numbered positions. Twenty eight cakes were baked on each pan and two pans were used. From each twenty eight, nine cakes were chosen, always from the same numbered position, being representative of the entire pan. Twenty five separate batches were made. Thus fourteen hundred cakes were actually baked and from this number 450 were measured for their breaking strength. The final result is the general average of these. In some cases as many as 3000 cakes were baked, using a single shortening.

The temperature of baking was 465° F. This temperature can be controlled to plus or minus 2½°. The temperature of the oven is undoubtedly not the same throughout but this irregularity is obviated by using a reel oven which takes the cracker through the relatively hot and cold regions, thereby giving it the same treatment.

Each batch was baked for the same length of time approximately ten minutes. The product was then cooled in the absence of drafts to prevent checking. It was then conditioned for two days in a closed cabinet where the temperature is the same and the humidity is constant. At the end of this time this cracker was put into the machine and broken by allowing shot to run into the supported container until the point of rupture occurs. All crackers are of the same size and when tested in the machine are always placed in the same relative position.

That cracker which requires the least load to measure its breaking strength is the shortest; that which requires the heaviest load is the least short. The best shortening is that material which when baked in a dough gives a minimum breaking strength and a minimum crushing strength to the cracker.

As a result of the tests described, I have determined that cakes in which lard is used as a shortening, break on the average when the weight with which member 12 strikes the cake is a certain definite figure. In the case of the other well known shortening materials the breaking strength of the cake, as indicated by the weight applied, is an amount which differs more or less from that of the cakes made with lard. In the tests which I have made, the breaking strength of cakes made with various shortening materials varies from 2 lbs. 15 ounces to 4 lbs. and $\frac{7}{10}$ ounce and the figures for the samples made with the same shortening materials are quite uniform.

As stated above, the same process may be used for classifying various flours, by simply changing the flour in the various test batches while leaving the shortening material and the other ingredients the same. I find that soft winter flour, medium winter wheat flour, strong winter wheat flour and spring wheat flour all produce cakes the breaking strength of which varies from one to another, while the breaking strengths of cakes made with the same flour are extremely uniform. Accordingly I am able to classify flours by noting the breaking strength of cakes containing the same, the flour with the lowest breaking strength being the softest.

It should be understood that my invention is not limited strictly to the details of construction of the apparatus or to details of process steps which have been particularly described but that the invention is as broad as is indicated by the accompanying claims.

What I claim is:

1. A process for testing the shortening values of different shortening ingredients in baked food products, which comprises making a series of cakes of identical composition under identical conditions, making another series of cakes under the same conditions as the first series, and with the same composition, except that a different shortening agent is used, in the same proportion as the shortening agent in the cakes of the first series, breaking cakes of each series by dropping increasing weights thereon from a height until the cakes break, and accurately measuring the force required to break the cakes of one series in comparison with the force required to break the cakes of the second series.

2. A process for testing and classifying the properties of different baked food products, which comprises making a series of cakes of identical composition under identical conditions, making another series of cakes under the same conditions as the first series, and with the same composition, except that in the case of one of the ingredients, either the shortening or the flour, a different material is substituted, in the same proportion as the material of similar function in the cakes of the first series, breaking cakes of each series by dropping increasing weights thereon from a height until the cakes break, and accurately measuring the force required to break the cakes of one series, in comparison with the force required to break the cakes of the second series.

3. A process for testing and classifying the properties of different baked food products, which comprises, making a series of cakes of identical compositions under identical conditions, making another series of cakes under the same conditions as the first series, and with the same composition, except that in the case of one of the ingredients, either the shortening or the flour, a different material is substituted, in the same proportion as the material of similar function in the cakes of the first series breaking cakes of each series along sharp lines by applying increasing weights along lines on the cakes, and accurately measuring the force required to break the cakes of one series in comparison with the force required to break the cakes of the second series crushing cakes of each series, and measuring the force required to crush the cakes of one series, in comparison with the force required to crush the cakes of the second series.

4. A process for testing and classifying the properties of different baked food products, which comprises accurately measuring the force required to break cakes of a known composition, made under known conditions, and accurately measuring the force required to break similar cakes in which one or more of the ingredients are different in kind or proportion, from the corresponding ingredients in the first named cakes, or in which the process of manufacture has differed, from that employed in the first named cakes, and comparing such force with the force required to break the first named cakes, the force required to break the cakes in each instance being obtained by dropping a striking member through a determined distance on the cake, and increasing the weight of the member progressively until an impact of the same upon the cake breaks the latter.

5. In a testing device of the character described, the combination of separated supports upon which a cake or the like may be positioned, a striking member positioned to strike a blow upon the cake intermediate said supports, said member having an elongated, comparatively narrow striking face, means for guiding said member, to enable it to repeatedly fall a determined distance upon the cake, and adjustable means for increasing the weight carried by said member.

6. In a testing device of the character described, the combination of a support for a cake or the like, a spindle, having a lower end of comparatively small diameter, adopted to strike the cake with a crushing blow, an elongated striking member having a narrow striking face, means for detachably securing said member to the lower end of said spindle, means for guiding said spindle, to enable it to fall a determined distance upon the cake, and adjustable means for increasing the weight carried by said spindle.

Signed at New York in the county of New York and State of New York this 4th day of April A. D. 1921.

CLARKE E. DAVIS.